United States Patent
Sasson et al.

(10) Patent No.: US 9,758,375 B2
(45) Date of Patent: Sep. 12, 2017

(54) PREPARATION OF AN AQUEOUS REAGENT FOR THE ABSORPTION OR DESTRUCTION OF POLLUTANTS

(71) Applicant: YISSUM RESEARCH DEVELOPMENT COMPANY OF THE HEBREW UNIVERSITY OF JERUSALEM LTD., Jerusalem (IL)

(72) Inventors: Yoel Sasson, Jerusalem (IL); Uri Stoin, Jerusalem (IL); Zach Barnea, Jerusalem (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 271 days.

(21) Appl. No.: 14/366,977

(22) PCT Filed: Dec. 20, 2012

(86) PCT No.: PCT/IL2012/000394
§ 371 (c)(1),
(2) Date: Jun. 19, 2014

(87) PCT Pub. No.: WO2013/093903
PCT Pub. Date: Jun. 27, 2013

(65) Prior Publication Data
US 2014/0348735 A1    Nov. 27, 2014

Related U.S. Application Data

(60) Provisional application No. 61/577,894, filed on Dec. 20, 2011, provisional application No. 61/660,819, filed on Jun. 18, 2012.

(51) Int. Cl.
*C01B 15/043* (2006.01)
*C02F 1/72* (2006.01)
(Continued)

(52) U.S. Cl.
CPC .......... *C01B 15/0435* (2013.01); *B01D 53/62* (2013.01); *B09C 1/08* (2013.01);
(Continued)

(58) Field of Classification Search
USPC ....... 588/313, 316, 317, 318, 320, 400, 405, 588/406, 414
See application file for complete search history.

(56) References Cited

U.S. PATENT DOCUMENTS

| | | | |
|---|---|---|---|
| 3,816,604 | A | 6/1974 | Malafosse |
| 6,365,099 | B1 | 4/2002 | Castrantas et al. |

(Continued)

FOREIGN PATENT DOCUMENTS

| | | |
|---|---|---|
| CN | 101119753 A | 2/2008 |
| CN | 101636584 A | 1/2010 |

(Continued)

OTHER PUBLICATIONS

Chinese Search Report issued in Application No. 2012800696498 dated Jul. 17, 2015.

(Continued)

*Primary Examiner* — Daniel Berns
(74) *Attorney, Agent, or Firm* — Nixon & Vanderhye P.C.

(57) ABSTRACT

Process for treating a medium by the removal or destruction of one or more undesired substances present in said medium, comprising combining hydrogen peroxide and alkali hydroxide in an aqueous solution to form superoxide, and bringing the resultant superoxide-containing solution into contact with said medium. The process is useful for the destruction of halogenated organic pollutants and also for carbon dioxide removal from flue gases. The process can also be applied for soil remediation.

20 Claims, 8 Drawing Sheets

(51) Int. Cl.
*B09C 1/08* (2006.01)
*B01D 53/62* (2006.01)
*B01D 53/70* (2006.01)
*B01D 53/96* (2006.01)

(52) U.S. Cl.
CPC ........ *C02F 1/722* (2013.01); *B01D 2251/106* (2013.01); *B01D 2251/304* (2013.01); *B01D 2251/306* (2013.01); *B01D 2251/604* (2013.01); *B01D 2252/10* (2013.01); *B01D 2257/502* (2013.01); *B01D 2257/504* (2013.01); *B01D 2258/01* (2013.01); *B01D 2258/0283* (2013.01); *Y02C 10/04* (2013.01); *Y02P 20/152* (2015.11)

(56) References Cited

U.S. PATENT DOCUMENTS

| | | | |
|---|---|---|---|
| 7,964,170 | B2 | 6/2011 | Singh |
| 8,549,857 | B2 | 10/2013 | Papile |
| 2007/0269358 | A1 | 11/2007 | Kamper et al. |
| 2008/0004389 | A1 | 1/2008 | Rho et al. |
| 2009/0087265 | A1* | 4/2009 | Lundy ........................ B09C 1/08 405/128.25 |
| 2010/0077752 | A1 | 4/2010 | Papile |
| 2011/0226006 | A1 | 9/2011 | Lackner et al. |

FOREIGN PATENT DOCUMENTS

| | | |
|---|---|---|
| CN | 201834216 U | 5/2011 |
| DE | 10 2008 058114 | 5/2010 |
| EP | 1 591 422 | 11/2005 |
| RU | 2 326 056 | 6/2008 |
| WO | WO 02/40138 | 5/2002 |
| WO | WO 2008/113061 | 9/2008 |

OTHER PUBLICATIONS

Eurasian Office Action issued in Application No. 201491197 dated Jan. 9, 2016 (w/ translation).
International Search Report for PCT/IL2012/000394 mailed May 8, 2013.
Written Opinion of the International Searching Authority mailed May 8, 2013.
J. Roberts et al., J. Am. Chem. Soc. 103, 1981, pp. 712-714.
L. Dubois et al., Chem. Eng. & Technology, vol. 33, No. 10, Oct. 2010, pp. 1601-1609.
Scott Elliott, Environ. Sci. Technol. 1990, 24 I, pp. 264-267.
N.F. Gladyshev et al., Russian Journal of Applied Chemistry, vol. 76, No. 11, 2003, pp. 1858-1859.

* cited by examiner

PREPARATION OF AN AQUEOUS REAGENT FOR THE ABSORPTION OR DESTRUCTION OF POLLUTANTS

This application is the U.S. national phase of International Application No. PCT/IL2012/000394 filed 20 Dec. 2012 which designated the U.S. and claims priority to U.S. Provisional Application No. 61/577,894, filed 20 Dec. 2011, and U.S. Provisional Application No. 61/660,819, filed 18 Jun. 2012, the entire contents of each of which are hereby incorporated by reference.

The invention relates to the preparation of an aqueous reagent based on the in-situ generation of the superoxide radical anion ($O_2^-$.), which has been found useful for various environmental activities, such as the destruction of halogenated organic pollutants and also for carbon dioxide removal from flue gases.

Low-molecular-weight halogenated hydrocarbons which are commonly produced and used by the chemical industry, e.g., carbon tetrachloride and dichloromethane, are considered among the most difficult contaminants to remove from groundwater and soil.

Carbon dioxide is a greenhouse gas, formed mainly by the combustion of fossil fuels, for example, in electric power generating plants. Fossil fuels combustion is responsible for releasing massive carbon dioxide amounts into the atmosphere, which immensely contributes to the global warming phenomenon. Global efforts are underway to remove $CO_2$ from the flue gases prior to their release to the atmosphere.

It is known that superoxide can be formed through an in situ electrochemical reduction of oxygen in aprotic solvents to give $O_2^-$.. Roberts et al. [J. Am. Chem. Soc. 103, 712-714 (1981)] reported such a reaction, which took place in dimethylformamide (DMF) and dimethyl sulfoxide ($Me_2SO$), where the resulting superoxide reacted with chlorinated methane compounds, i.e., $CCl_4$, $CHCl_3$, $CH_2Cl_2$ and $CH_3Cl$.

Superoxide is also available in the form of its solid alkali metal salts, e.g., potassium superoxide ($KO_2$) and sodium superoxide ($NaO_2$), which are fairly stable in a solid form when kept in a dry environment. WO 2008/113061 provides a method for removing carbon dioxide from combustion exhaust, comprising capturing the carbon dioxide using either solid $KO_2$ (i.e., in the form of pellets) or molten $KO_2$.

WO 02/40138 describes a process for removing nitrogen oxides from flue gases, following which the gas is led through a peroxide reservoir to convert some carbon dioxide to carbonate. A base may be added to the reservoir to set the pH value of the liquid at around 5 in order to allow dissolution of the carbonate.

L. Dubois et al [Chemical Engineering & Technology, vol. 33 issue 10, pp. 1601-1609, October 2010] describes the absorption of $H_2S$ and $CO_2$ into solutions comprising a low concentration (i.e. up to 1.0 M) of NaOH and $H_2O_2$.

Scott Elliott [Environ. Sci. Technol. 1990, 24 I, pp. 264-267] describes the hydrolysis of carbon disulfide in an aqueous alkaline solution in the presence of hydrogen peroxide.

US 2007/0269358 discloses a process for absorbing chlorine from a gas mixture containing chlorine and carbon dioxide, comprising, in a first stage, contacting the gaseous mixture with a first aqueous solution comprising a base and a reducing agent, and in a second stage, contacting the intermediate gaseous mixture obtained with a second aqueous solution comprising a base and a reducing agent. The base reacts with the carbon dioxide to form a carbonate salt, following which chlorine is reduced by the reducing agent concurrently with the release of $CO_2$.

It has now been found that an aqueous solution comprising hydrogen peroxide and a base (e.g., alkali hydroxide) can be used for the absorption of carbon dioxide from flue gases. Under certain conditions, sodium (or potassium) hydroxide and hydrogen peroxide react to produce in situ the highly reactive superoxide anion, which in turn rapidly reacts with carbon dioxide to afford a carbonate salt.

It has also been found that when the aforementioned aqueous solution comprising hydrogen peroxide and a base (e.g., alkali hydroxide) is brought into contact with halogenated organic compounds in the presence of a phase transfer catalyst, then the pollutant undergoes rapid mineralization.

The present invention is therefore primarily directed to a process for treating a medium by the removal or destruction of one or more undesired substances present in said medium, comprising combining hydrogen peroxide and hydroxide source in an aqueous solution to form superoxide, and bringing the resultant superoxide-containing solution into contact with said medium. It should be noted that in some circumstances the medium consists solely of the undesired substance to be destroyed. In other words, in these circumstances, the undesired substance constitutes the medium itself.

Hydrogen peroxide is applied in the process in the form of an aqueous solution at a concentration which is preferably not less than 10M, e.g., between 10M and 30M. Suitable hydroxide sources to be used are alkali hydroxide, e.g., sodium hydroxide and potassium hydroxide, with sodium hydroxide being most preferred. The hydrogen peroxide and the hydroxide source are combined in situ at the treatment site, such that the resultant superoxide-containing aqueous solution can be put to use almost instantly, e.g., preferably within a period of time of not more than one minute, and even more preferably within less than five seconds, e.g., within one second, following the formation of the solution. For this purpose, the hydroxide source can be added as a solid to the $H_2O_2$ aqueous solution under stirring. However, it is generally preferred to dissolve the hydroxide source in a separate solution and then mix together the $H_2O_2$ and hydroxide solutions, following which the combined stream is brought into contact with the pollutant-contaminated medium. It is also possible to inject two separate streams consisting of aqueous $H_2O_2$ and hydroxide solutions into the pollutant-contaminated medium.

In any case, the concentrations and relative amounts of the two reactants are suitably adjusted such that the reaction results in the in situ formation of the superoxide radical anion $O_2^-$. by the following sequence of reactions:

$$2MOH + H_2O_2 \rightarrow M_2O_2 + 2H_2O \qquad (I)$$

$$M_2O_2 + 2H_2O_2 \rightarrow 2MO_2 + 2H_2O \qquad (II)$$

wherein M denotes the alkali metal, e.g., either sodium or potassium. To this end, the hydroxide source and hydrogen peroxide are combined in an aqueous solution, with the hydroxide concentration added to the solution being not less than 1.5 M, preferably not less than 1.9 M, e.g., in the range of 2.25 to 20.0 M, and more preferably in the range of 3.0 to 9.0 M. The molar ratio between the hydrogen peroxide and the hydroxide ion combined in the solution is above 1:1, preferably above 1.1:1, more preferably above 1.2:1, e.g., in the range of 1.2:1 to 2:1, with a ratio of at least 1.4:1, e.g., from 1.4:1 to 1.6:1, and particularly around 1.5:1, being especially preferred. Under these conditions, the pH of the aqueous solution formed is preferably higher than 10.0, more preferably higher than 11.0 and most preferably higher than 12.0, e.g., from 10.5 to 12.5, and a workable amount of the active superoxide species is formed in the solution, such that the solution can serve for the purification of a pollutant-contaminated medium.

The formation of the superoxide in the solution may be confirmed by means of Infrared spectroscopy. The characteristic IR stretching frequency of the $O_2^-$ species is at a wavelength of about 1108 cm$^{-1}$ [see L. Andrews, "*Infrared Spectrum, Structure, Vibrational Potential Function, and Bonding in the Lithium Superoxide Molecule LiO$_2$*", Journal of Chemical Physics, 1969 Volume 50, Number 10; Lester Andrews, "*Infrared Spectra and Bonding in the Sodium Superoxid and Sodium Peroxide Molecules*", The Journal of Physical Chemistry, 1969, Volume 78, Number 11]. Alternative methods for superoxide identification are based on Raman spectroscopy and Electron Paramagnetic Resonance spectroscopy (EPR).

The superoxide-containing aqueous solution, prepared as set out above, can be put to use for the purification of different types of pollutant-contaminated mediums. Pollutants that can be removed or destroyed by the process of the invention can generally be considered as electrophiles. Exemplary applications will be described separately in the passages that follow.

A first application relates to $CO_2$ absorption from gaseous streams, e.g., the pollutant-contaminated medium is a gaseous mixture which needs to be purified by means of the removal carbon dioxide. The superoxide anion rapidly reacts with carbon dioxide to afford a carbonate salt:

$$2MO_2 + CO_2 \rightarrow M_2CO_3 + 1.5O_2 \qquad (III)$$

It should be noted that the rate of reaction of the superoxide anion with $CO_2$ is three orders of magnitude faster than the reaction of the latter with the hydroxide anion:

$$CO_2 + 2MOH \rightarrow M_2CO_3 + H_2O \qquad (IV)$$

According to the process of the invention, a gaseous mixture comprising carbon dioxide, e.g., flue gases formed by the combustion of fossil fuels in electric power generating plants, is made to contact an aqueous solution of hydrogen peroxide and a hydroxide salt. The contact takes place in a gas-liquid contactor, e.g., a suitable vertical structure known in the art, namely, in a tower or a column, in which an upward flow of gases to be purified and a countercurrent of a descending liquid are allowed to mix, as described in more detail hereinafter below.

The absorption of carbon dioxide by the superoxide anion may be carried out at a broad temperature range, e.g. in the range from 5 to 80° C., e.g. from 20 to 60° C., and suitably at room temperature (20 to 25° C.), at a pH value of not less than 10, e.g., in the range from 10.5-12.5.

As noted above, carbon dioxide is converted into an alkali carbonate salt ($Na_2CO_3$ or $K_2CO_3$), which can be subsequently treated with calcium hydroxide [$Ca(OH)_2$] to regenerate the corresponding alkali hydroxide concurrently with the formation of the water-insoluble, easily separable calcium carbonate ($CaCO_3$). The latter can be treated to obtain calcium hydroxide.

The description that follows refers to FIG. 1, which illustrates a flue gas scrubbing apparatus which is suitable for removing carbon dioxide from the flue gases, in accordance with the process of the invention. The apparatus comprises a gas liquid contactor (1), which is typically in the form of a vertically positioned absorber tower, through which a gaseous stream flows in an upward direction and contacts with a countercurrent of descending liquid. For example, the gas-liquid contactor which provides the contact between $CO_2$ and the superoxide-containing solution is a packed scrubbing tower or a spray tower. The flue gas (2), which typically comprises from about 1% to 50% carbon dioxide, e.g., about 12% carbon dioxide, enters the tower through an inlet pipe connected to the perimeter of the tower. The flue gas is caused to flow in an upward direction through the tower using a pump (3) which may operate at throughput of about 0.1 to 5,000,000 m$^3$/hr. Prior to being introduced into the tower, the flue gas is passed through a heat exchanger (4) where its temperature is reduced to less than 150° C., e.g., about 70 to 150° C.

Packing material that increases the contact area between gaseous and liquid streams is conventionally mounted within the tower. For example, the tower may have a fill assembly positioned therein, which assembly is in the form of a three-dimensional matrix composed of a plurality of grids spaced from one another and disposed in perpendicular planes to form essentially cubic spaces there between, into which spaces fibrous material is introduced. In operation, the gaseous stream to be purified and the liquid absorbent are brought into intimate contact within the surfaces made by said fibrous material, which surfaces are being supported by means of said fill assembly within the tower. The spray tower is equipped with a plurality of spray headers (not shown) mounted in the internal space of the tower.

The superoxide-containing solution is produced by allowing a concentrated hydroxide solution and a concentrated hydrogen peroxide solution to react in a mixing chamber (7), as described henceforth. A concentrated hydroxide solution is prepared in-situ by continuously or periodically adding a solid hydroxide salt, such as sodium or potassium hydroxide, to a first mixing chamber (5), into which water is allowed to flow, thus dissolving the salt. The concentrated hydroxide solution and a concentrated hydrogen peroxide aqueous solution are separately pumped from mixing chamber (5) and reservoir (6), respectively, into a second mixing chamber (7), wherein the superoxide anion is formed through reactions (I) and (II) mentioned above. The concentrations and relative flow rates of the two separated streams of hydroxide and hydrogen peroxide are adjusted such that the resultant concentration of hydroxide in the mixing chamber, prior to the formation of superoxide, is above 1.5 M, preferably between 1.6-20 M, and more preferably between 6 and 9 M, and the molar ratio between the hydrogen peroxide and alkali hydroxide is preferably about 3:2. The resultant concentration of superoxide in the mixing chamber is, for example, in the range of 1.5 to 6 M. The superoxide-containing solution is then directed from the mixing chamber into the upper section of the tower using a pump (8) and is dispersed in the internal section of the tower through the spray headers (not shown). The aqueous mixture flows downward due to the force of gravity, contacts with the flue gas and absorbs the carbon dioxide.

Having been subjected to the scrubbing operation in the absorber tower, the upwardly flowing, essentially $CO_2$-free, oxygen-enriched flue gas is released to the atmosphere through a gas outlet opening (9) positioned in the upper section of the absorber tower. A drop separator (not shown) may be mounted in upper section of the tower, such that the gas permitted to escape from the tower is free of mist. Alternatively, the scrubbed flue gas, typically containing around 12% oxygen, may be directed back to the combustion plant (not shown) in order to facilitate the combustion process.

The aqueous solution is collected at the bottom of the tower, and is directed via pipe (10) through a centrifuge (11) wherein the solid carbonate salt is separated from the aqueous solution. Subsequently, excess water, formed during the reaction of hydroxide and hydrogen peroxide and added to the apparatus with the addition of hydrogen peroxide, is discharged via an outlet opening (12) by the use of a pump (13), in order to keep a constant volume of aqueous absorption solution within the apparatus. The aqueous absorption solution (water) is then recycled, via mixing chambers (5) and (7) by the use of a pump (14), back to the upper section of the scrubbing tower.

The continuous flow rate of the recycled aqueous solution within the apparatus, as well as the rates of addition of the concentrated hydrogen peroxide solution and the hydroxide source to the apparatus, are preferably adjusted such that carbon dioxide absorption reaches over 50%, preferably over 90% and most preferably over 95%, while maintaining a minimum amount of superoxide ion in the discharged water (12), namely, less than 1 M, and preferably less than 0.1 M.

The process of the invention can be carried out in a continuous mode of operation, wherein separate streams of alkali hydroxide solution and a hydrogen peroxide solution are fed continuously to the mixing chamber (7) of the apparatus of FIG. 1. In another embodiment of the invention, the carbon dioxide absorption process is semi-continuous. According to the latter embodiment, the hydrogen peroxide and hydroxide source are added periodically to the apparatus, allowing the formation of the superoxide anion, while the aqueous absorbent is recycled continuously through the apparatus. The frequency of addition of $H_2O_2$ and $OH^-$ is adjusted to allow the superoxide anion formed to react with carbon dioxide.

It is possible, as an alternative to the continuous or semi-continuous addition of hydroxide salt to the apparatus, to recover the hydroxide salt used throughout the process by the following method. The carbonate salt formed following the reaction between carbon dioxide and sodium/potassium superoxide (see equation III above) is separated from the aqueous absorption medium and is then mixed with calcium hydroxide, preferably in a stoichiometric amount. Calcium hydroxide reacts with the carbonate salt to regenerate sodium/potassium hydroxide by the following reaction:

$$M_2CO_3 + Ca(OH)_2 \rightarrow 2MOH + CaCO_3 \quad (V)$$

wherein M denotes either sodium or potassium. Calcium carbonate precipitates while the regenerated hydroxide salt is recycled back to the absorption medium.

In view of the fact that some of the sodium/potassium carbonate may exist in hydrated forms, e.g. in the form of thermonatrite [$Na_2CO_3 \cdot H_2O$] or trona [$Na_3H(CO_3)_2 \cdot 2H_2O$], the yield of recoverable sodium/potassium hydroxide may gradually decrease. To compensate for the loss of yield, a suitable amount of sodium/potassium hydroxide can be added to the apparatus via mixing chamber (5) in a continuous or semi-continuous manner.

The solid calcium carbonate formed simultaneously with the recovery of sodium/potassium hydroxide may be separated (e.g., by filtration) and discharged. Alternatively, it may be heated to a temperature in the range of about 800 to 1000° C., and preferably 900° C., at atmospheric pressure to afford calcium oxide and liberated carbon dioxide.

$$CaCO_3 \rightarrow CaO + CO_2 \quad (VI)$$

Calcium oxide rapidly reacts with water to regenerate calcium hydroxide:

$$CaO + H_2O \rightarrow Ca(OH)_2 \quad (VII)$$

The regenerated calcium hydroxide thus formed may be reused for the regeneration of sodium/potassium hydroxide as described above. The chemistry of the carbon dioxide absorption process of the invention, including the regeneration of sodium/potassium hydroxide, is illustrated schematically in FIG. 3.

A second application of the superoxide-containing aqueous solution of the invention relates to the destruction of halogenated organic pollutants. The term "halogenated organic pollutant" includes halogen-substituted aliphatic hydrocarbons, e.g., halogenated C1-C3 alkanes and alkenes, (especially halogenated methane, ethane and ethylene compounds, namely, $CH_iX_j$ wherein X is independently Cl, Br or I, and $j \geq 1$ and $i+j=4$ and $C_2H_kX_m$ wherein X is independently Cl, Br or I, $m \geq 1$ and $k+m=4$ or 6, including the mixed halogen-substituted compounds) and also halogen-substituted cyclic hydrocarbons, including aromatic hydrocarbons, e.g., benzene ring substituted with one or more halogen atoms. The process is especially useful for the destruction of chlorinated hydrocarbons, allowing at least the transformation of the pollutant to a more environmentally benign state, and more preferably, the mineralization of the pollutant (mineralization is particularly achievable with respect to mono and polyhalogen methane).

The process can be applied for the destruction of halogenated organic pollutant at the bulk, i.e., water-immiscible, dense organic liquid consisting essentially of the halogenated pollutant is treated with the superoxide-containing solution of the invention. In these circumstances, the medium consists solely of the undesired substance to be destroyed. However, the process can also be applied for destroying the halogenated organic pollutant when it is present as a minor component contaminating a second organic liquid, in order to purify and recycle said second liquid.

In both cases, the in-situ generated superoxide-containing aqueous solution is brought into contact with the halogenated organic pollutant at ambient conditions in the presence of a phase transfer catalyst (PTC). Exemplary reactions demonstrating the complete mineralization of two pollutants by means of the aqueous solution of the invention are given by the following two sets of chemical equations:

$$2MOH + H_2O_2 \rightarrow M_2O_2 + 2H_2O \quad (1)$$

$$M_2O_2 + 2H_2O_2 \rightarrow 2MO_2 + 2H_2O \quad (2)$$

$$CH_3X + 2MO_2 \xrightarrow{PTC} CO_2 + MOH + MX + H_2O \quad (3)$$

$$CO_2 + 2MO_2 \rightarrow M_2CO_3 + 1.5O_2 \quad (4)$$

Such that the mineralization of methyl halide is given by:

$$CH_3X + 3MOH + 6H_2O_2 \xrightarrow{PTC} M_2CO_3 + MX + 1.5O_2 + 9H_2O \quad (5)$$

As to tetrahalomethane, e.g., tetrachloromethane, the following equations apply:

$$2MOH + H_2O_2 \rightarrow M_2O_2 + 2H_2O \quad (1')$$

$$M_2O_2 + 2H_2O_2 \rightarrow 2MO_2 + 2H_2O \quad (2')$$

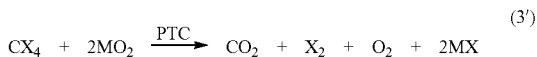

$$CX_4 + 2MO_2 \xrightarrow{PTC} CO_2 + X_2 + O_2 + 2MX \qquad (3')$$

$$CO_2 + 2MO_2 \rightarrow M_2CO_3 + 1.5O_2 \qquad (4')$$

The total mineralization of methyl (tetra)halide is hence given by:

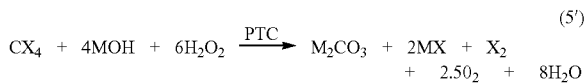

$$CX_4 + 4MOH + 6H_2O_2 \xrightarrow{PTC} M_2CO_3 + 2MX + X_2 + 2.5O_2 + 8H_2O \qquad (5')$$

Phase transfer catalysts which are suitable for use in the reactions set forth above are composed of a nitrogen-containing cation, e.g., quaternary ammonium cation, namely, $N^+R_1R_2R_3R_4$ wherein each of $R_1$, $R_2$, $R_3$ and $R_4$ is independently C1-C18 alkyl group (preferably C1-C12 alkyl, which may be either linear or branched, most preferably linear) and a counter anion, which is displaceable by superoxide, e.g., halide anion (designated herein Hal⁻).

Especially preferred are quaternary ammonium salts of the formula $N^+CH_3[(CH_2)_kCH_3]_3$ Hal-, wherein k is at least 5, e.g., between 5 to 9, and Hal is chloride or bromide. As an example of this preferred sub-class of quaternary ammonium salts, methyltrioctyl ammonium halide can be mentioned (k=7), which is commercially available in the form of its chloride salt as Aliquat 336.

Other examples include salts of the following formulas:

$N^+(CH_3)_2[(CH_2)_kCH_3]_2Hal^-$, such as didodecyldimethylammonium bromide (DDRB);

$N^+(CH_3)_3[(CH_2)_kCH_3]Hal$-, such as hexadecyltrimethylammonium bromide (CTAB); and $N^+[(CH_2)_kCH_3]_4Hal$-, such as tetraoctylammonium bromide (TOAB).

The hydrogen peroxide aqueous solution, the alkali hydroxide, the phase transfer catalyst and the pollutant (or the pollutant-contaminated organic liquid) are vigorously mixed together in a suitable tank, as shown, for example, in FIG. 12, which illustrates an apparatus for carrying out the process of the invention for the destruction of halogenated organic pollutant at the bulk. In the specific embodiment shown in FIG. 12, the destruction of carbon tetrachloride (abbreviated "CTC") is demonstrated. A similar apparatus, however, can also be used for decontaminating an organic liquid in which the halogenated pollutant is present as a minor component.

As shown in FIG. 12, CTC (31) is fed by means of pump (32) into a reaction chamber (33). A concentrated hydroxide solution is prepared in-situ by continuously or periodically adding solid hydroxide salt, such as sodium or potassium hydroxide (38), into a first reactor (37) through which water is allowed to flow continuously by means of pump (39), thus dissolving the salt. The concentrated hydroxide solution and a concentrated hydrogen peroxide aqueous solution (35) flow into a second reactor (36), wherein the superoxide anion is formed through reactions (I) and (II) mentioned above. The concentrations and relative flow rates of the two separated streams of hydroxide and hydrogen peroxide are adjusted such that the resultant concentration of hydroxide in the mixing chamber, prior to the formation of superoxide, is above 1.5 M, preferably between 1.6-20 M, and more preferably between 6 and 9 M, and the molar ratio between the hydrogen peroxide and alkali hydroxide is preferably about 3:2. The resultant concentration of superoxide in the reactor (36) is, for example, in the range of 1.5 to 6 M. The superoxide-containing solution then flows from the reactor (36) into the reaction chamber (33) by means of pump (34). Feed line (311) is used for injecting suitable amounts of a solution of the phase transfer catalyst (PTC) into the reaction chamber (33), where the aqueous solution and the CTC are vigorously mixed in the presence of the PTC. Without wishing to be bound by theory, it is believed that the halide ion of the quaternary ammonium salt phase transfer catalyst is displaced by the superoxide anion, whereby the superoxide is being extracted to the water-miscible organic medium, where it exhibits extremely potent nucleophilic character and reacts rapidly, e.g., within minutes, at ambient conditions with the low-molecular weight halogenated compounds. The amount of phase transfer catalyst is at least 1 mol % relative to the halogenated compound to be destroyed, e.g., from 1 to 10 mol %, preferably from 4 to 6 mol %, e.g., around 5 mol %.

The apparatus shown in FIG. 12 is provided with two discharge lines, through which the reaction products are withdrawn from the reaction chamber (33). A gaseous mixture comprising oxygen and chlorine produced by the reaction is released to the atmosphere (317). During the disappearance of the dense halogenated organic pollutant (i.e., the CTC), an aqueous mixture which contains the salts formed in the reaction (i.e., $Na_2CO_3$ and NaCl) is gradually collected at the bottom of the reaction chamber (33). This aqueous mixture also contains the PTC in the form of a separate layer disposed onto the water surface. The aqueous mixture is discharged (310) from the reaction chamber and conveyed to a separator (313). In the separator, the PTC layer is removed from the aqueous phase by techniques known in the art and is recycled, namely, directed back to the reaction chamber (33) through the feed line (311). The aqueous phase can now be treated in order to recover the water soluble sodium chloride and the partially insoluble sodium carbonate salts (315). Following the separation of the salts, the water, which is both formed during the reaction of hydroxide and hydrogen peroxide and added to the apparatus with the addition of hydrogen peroxide, is withdrawn by the use of a pump (314) and collected at a suitable tank (316). The water is recycled, via reactors (37) and (36) by the use of a pump (39).

A third application of the superoxide-containing aqueous solution of the invention relates to environmental remediation methods, e.g., for treating contaminated soil. The introduction of the combination of hydrogen peroxide and alkali hydroxide into contaminated soil, for in-situ chemical oxidation of toxic and persistent organic waste, can be achieved by means of suitable injection systems, adjusting injection pressure and injection depth to increase decontamination efficiency. Another aspect of the invention relates to a site remediation process, comprising injecting a first stream of hydrogen peroxide solution and a second stream of aqueous alkali hydroxide, or a combined stream of both, into halogenated organic pollutant-contaminated site (e.g., soil) such that the molar ratio between the hydrogen peroxide and the hydroxide ion is preferably above 1.1:1, more preferably above 1.2:1, e.g., in the range of 1.2:1 to 2:1, with a ratio of at least 1.4:1, e.g., from 1.4:1 to 1.6:1, and especially 1.5:1, being most preferred. The concentration of the hydrogen peroxide and alkali hydroxide in the combined aqueous stream are as set out above. The hydrogen peroxide and the hydroxide ion are delivered and distributed throughout the region to be treated. It should be noted that following the treatment, the pH of the soil is alkaline. The pH of the soil may be readily restored to a range acceptable for agricultural utilities by means of the addition of one or more acids such as nitric acid and phosphoric acid. This addition results not only in neutralizing the pH of the soil, but also in the enrichment of the soil with useful fertilizers. The soil remediation according to the invention allows the mineralization of polyhalogen (chlorinated) methane compounds, leaving no harmful products, or at least the transformation of the contaminant to a more benign substance.

Figure 16:
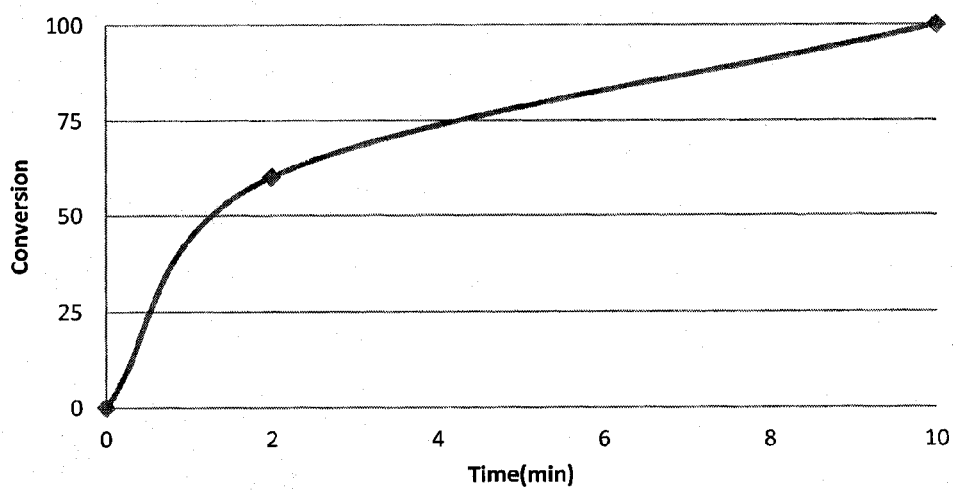

FIG. 16 demonstrates the destruction of chlorobenzene.

EXAMPLES

Materials

Carbon dioxide gas cylinders 30% (w/w) in nitrogen was purchased from Maxima gas supplier, Israel.

Carbon dioxide gas cylinders 100% was purchased from Mushilion gas supplier, Israel.

30% aqueous hydrogen peroxide solution was purchased from Bio Lab ltd, Israel.

Sodium hydroxide, potassium hydroxide, lithium hydroxide, rubidium hydroxide, monoethanolamine (MEA), halogenated alkanes and alkenes (e.g., methyl iodide, carbon tetrachloride, bromotrichloro methane), Aliquat 336, CTAB, DDAB, and TOAB were purchased from Sigma Aldrich ltd, Israel.

Measurements

Gas chromatography (GC) studies were conducted using GC with FID detector Framewax™ 30 m, 0.32 mm ID, 0.25 μm, manufactured by Resteck ltd, U.S.

FTIR studies were conducted using Peact IR 4000, manufactured by Metier.

XRD studies were conducted using X-ray diffractometer, Range: 110°<2θ>168°, D8 advance by Bruker AXS.

$CO_2$ concentration was determined using a gas analyzer manufacture by Emproco ltd Israel.

$CO_2$ Absorption Measurement Set-Up

Figure 1:
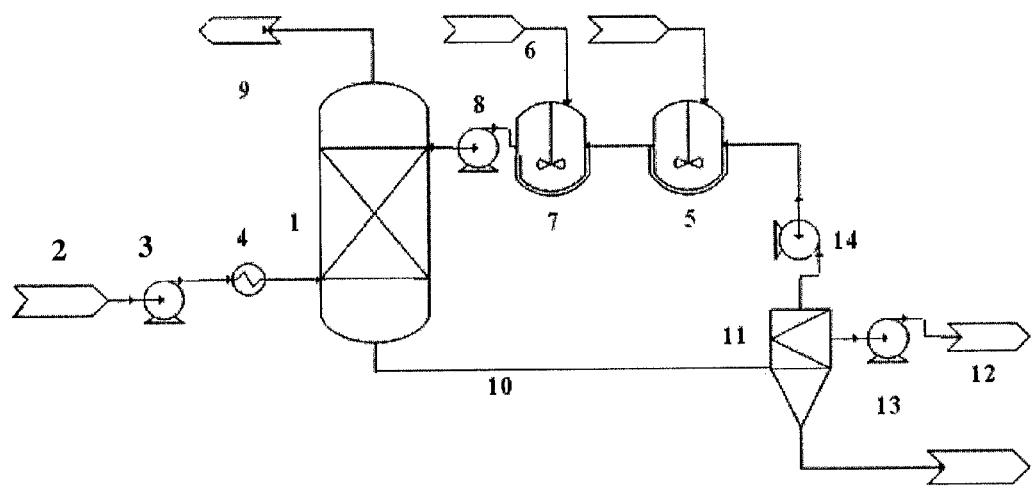
FIG. 1 illustrates a scrubbing apparatus suitable for carrying out the absorption of $CO_2$ from a gaseous mixture.
Figure 2:
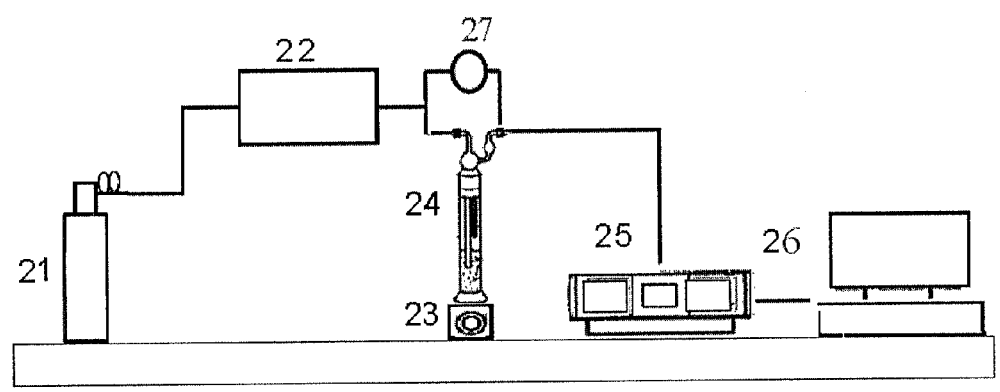
FIG. 2 illustrates the experimental set-up employed in the experimental work regarding $CO_2$ absorption.
Figure 3:
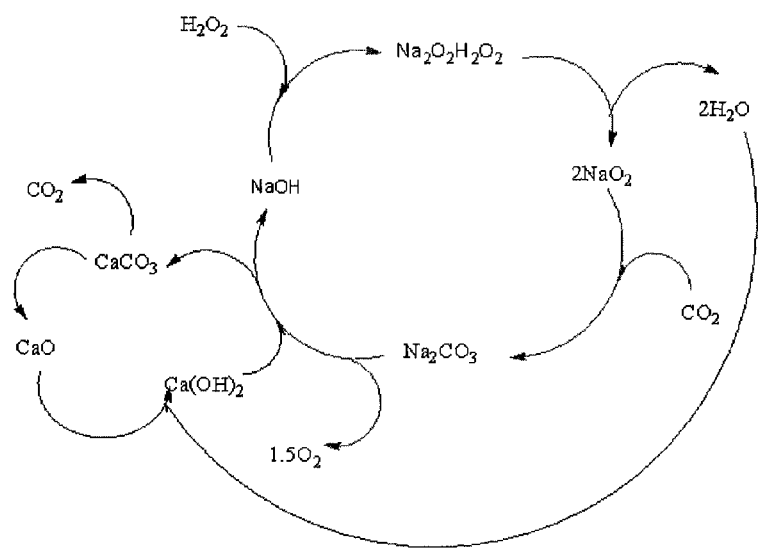
FIG. 3 is a schematic illustration of $CO_2$ absorption process, including the regeneration of sodium hydroxide.

The experimental set-up used in the following examples is shown schematically in FIG. 2. $CO_2$ was made to flow through a flow meter (22) at a flow rate of 1 L/minute into a gas trap (24) loaded with the aqueous absorbing solution, which was continuously stirred by a magnetic stirrer (23). The $CO_2$ source was a commercial 100% $CO_2$ or commercial 30% (w/w) $CO_2$ in nitrogen gas cylinder (21). The contact time between the $CO_2$ and the absorbing solution in the gas trap was approximately 0.01 seconds. Gases exiting the gas trap were directed through an $O_2/CO_2$ analyzer (25) connected to a computer (26).

The initial $CO_2$ concentration was measured by using a bypass (27), through which the $CO_2$ flows directly into the analyzer, thus determining the $CO_2$ concentration at time zero. Subsequently the absorber trap was connected, and the $CO_2$ gas concentration in the outlet of the trap was measured. The absorption yield was calculated by the following formula:

$$\% \text{ absorption} = [CO_{2\,TimeZero} - CO_{2\,Measured}]/CO_{2\,TimeZero}.$$

Example 1

Figure 4:
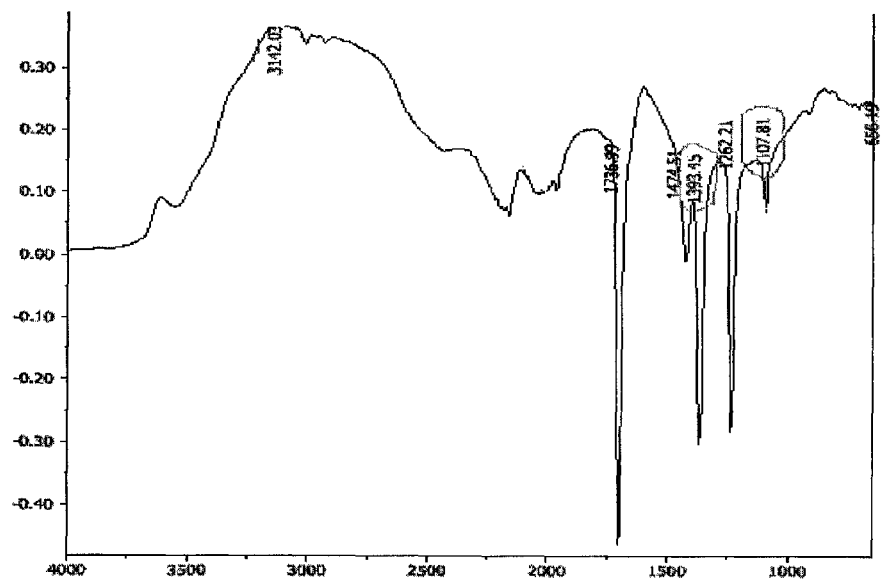
FIG. 4 shows the IR spectra of an aqueous absorption solution comprising sodium hydroxide and hydrogen peroxide.

$CO_2$ Absorption by an Aqueous Solution of Hydrogen Peroxide and Sodium Hydroxide An aqueous absorption solution comprising water (30 mL), sodium hydroxide (10 grams; 0.25 mol) and 0.375 mol hydrogen peroxide (11.3 mL of 30% $H_2O_2$ aqueous solution) was prepared. The formation of superoxide in the solution was confirmed by Fourier transform infrared spectroscopy (FTIR). The spectrum of the absorption medium, depicted in FIG. 4, includes a peak at 1108 cm$^{-1}$ attributed to the $O_2^-$ molecule.

The absorption of $CO_2$ by the absorption solution was measured using the experimental set-up described above. The gas trap was loaded with the absorption solution. The experiment was allowed to continue for five minutes, during which the $CO_2$ absorption was measured periodically.

For the purpose of comparison, $CO_2$ absorption was measured under the same conditions in the absence of hydrogen peroxide, using an alkaline solution consisting of 0.25 mol (10 grams) sodium hydroxide dissolved in 30 ml of water as the absorption solution. The absorption of $CO_2$ by monoethanolamine (abbreviated MEA) was also tested under the same conditions using 30 mL water and 0.25 mol (15.27 grams) MEA as the absorption solution.

Figure 5:
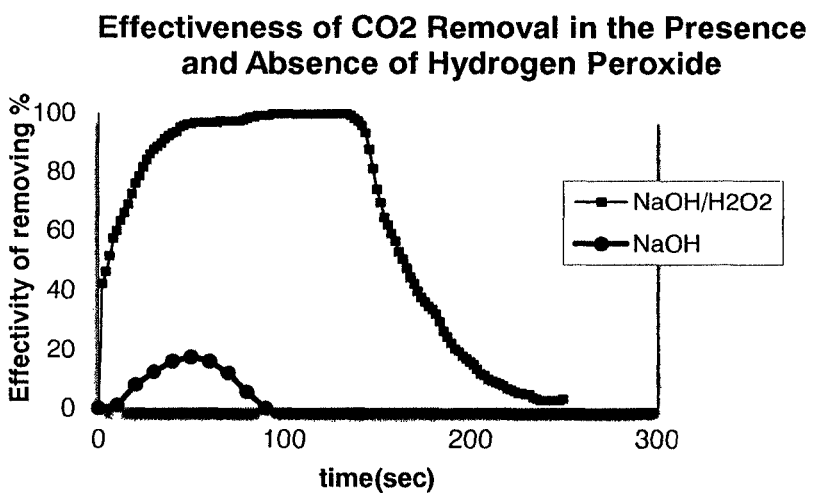
FIG. 5 is a graph showing the absorption of $CO_2$ by an aqueous hydroxide solution in the presence and absence of $H_2O_2$, plotted versus time.

The results are presented graphically in FIG. 5 which shows the $CO_2$ absorption (as percent relative to the initial $CO_2$ concentration) against time (in seconds) in the presence and absence of hydrogen peroxide. As shown, the absorption of $CO_2$ by an aqueous solution of sodium hydroxide and hydrogen peroxide reached approximately 100% for a duration of about 130 seconds. $CO_2$ absorption in the absence of hydrogen peroxide, in contrast, reached a maximum value of merely 20%.

Figure 6:
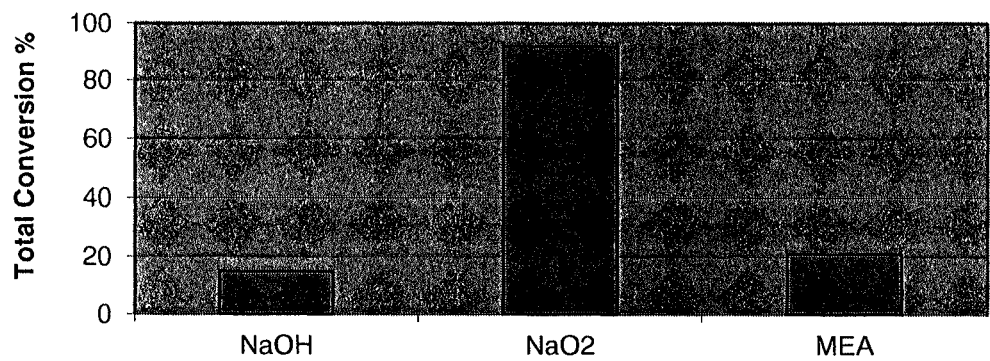
FIG. 6 is a graph depicting the efficiency of $CO_2$ absorption by $NaO_2$ in comparison to NaOH and MEA.

FIG. 6 depicts the conversion of $CO_2$ by the aqueous solution of sodium hydroxide and hydrogen peroxide as the absorption solution, in comparison to sodium hydroxide and MEA. It may be appreciated that the total $CO_2$ conversion by the absorption medium of the invention reached over 90%, in comparison to about 20% by each of the NaOH and MEA solutions.

Example 2

$CO_2$ Absorption by an Aqueous Solution of Sodium Hydroxide and Hydrogen Peroxide at Different Temperatures The absorption of $CO_2$ by an aqueous solution of sodium hydroxide and hydrogen peroxide was measured using the experimental set-up described above. The gas trap was loaded with an aqueous solution consisting of water (30 mL), sodium hydroxide (10 grams; 0.25 mol) and 0.375 mol hydrogen peroxide (11.3 mL 30% $H_2O_2$ aqueous solution). The experiment was allowed to continue for five minutes, during which the $CO_2$ absorption was measured periodically.

The above experiment was carried out under the same conditions at four different temperatures (298 K, 313 K, 323 K and 353 K).

Figure 7:
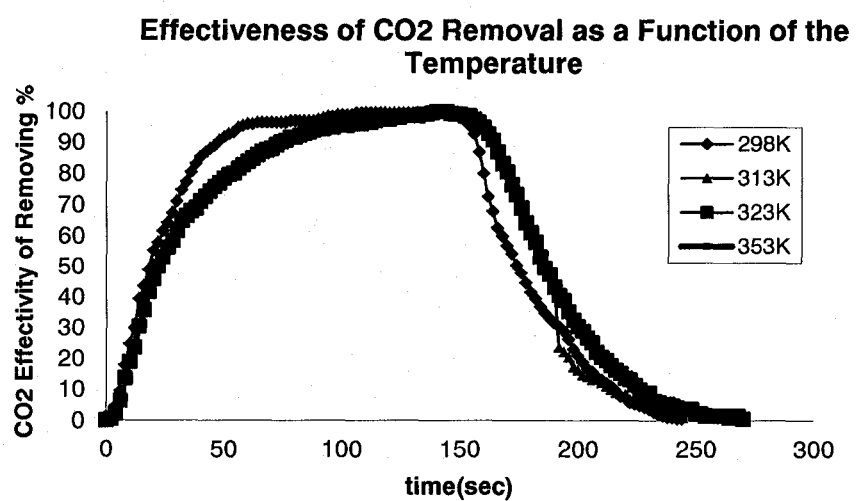
FIG. 7 is a graph illustrating the temperature dependence of $CO_2$ absorption by the superoxide anion.

FIG. 7 depicts the absorption of $CO_2$ over time for each of the four temperatures. As shown, the $CO_2$ absorption value reaches 100% throughout the entire tested temperature range.

Example 3

$CO_2$ Absorption by an Aqueous Solution of Hydrogen Peroxide and Sodium or Potassium Hydroxide The absorption of $CO_2$ by an aqueous solution of hydrogen peroxide and a hydroxide salt was measured using the experimental set-up described above. The experiment was carried out at room temperature (298 K). The gas trap was loaded with water (30 mL), 0.375 mol hydrogen peroxide (11.3 mL 30% $H_2O_2$ aqueous solution) and 0.25 mol of the tested hydroxide salt. The experiment was allowed to continue for five minutes, during which the $CO_2$ absorption was measured periodically.

Figure 8:
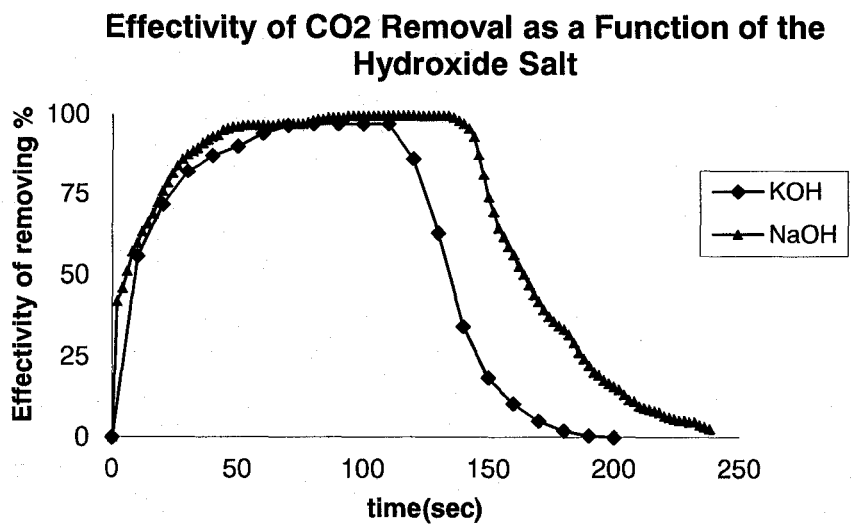
FIG. 8 is a graph illustrating $CO_2$ absorption by an aqueous solution of hydrogen peroxide and different hydroxide salts.

The results are graphically presented in FIG. 8, where the abscissa indicates the time (seconds) and the ordinate indicates the $CO_2$ absorption. It may be appreciated that the two bases tested, sodium hydroxide and potassium hydroxide, are both highly effective with the former being slightly better.

Example 4

The Effect of Hydroxide Concentration on $CO_2$ Absorption

The absorption of $CO_2$ by an aqueous solution of hydrogen peroxide and sodium hydroxide was measured using the experimental set-up described above. A set of experiments was carried out using as absorption medium consisting of water (30 mL), 0.375 mol hydrogen peroxide (11.3 mL 30% $H_2O_2$ aqueous solution) and various quantities of sodium hydroxide. The tested sodium hydroxide concentrations were 0.625 M, 1.25 M, 1.88M, 2.5 M, 5.0 M and 6.25 M. Each experiment was allowed to continue for five minutes, during which the $CO_2$ absorption was measured periodically.

Figure 9:
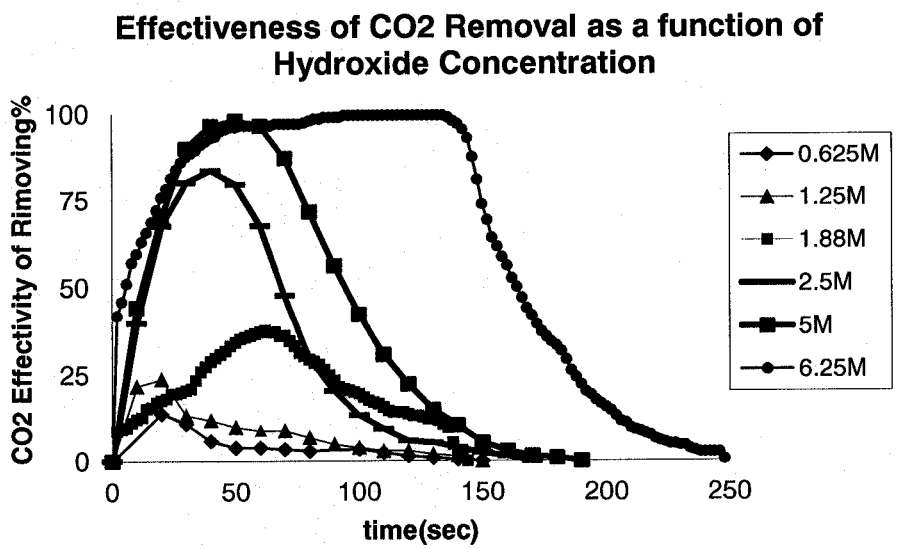
FIG. 9 is a graph depicting $CO_2$ absorption at different hydroxide concentrations.

FIG. 9 illustrates the absorption of $CO_2$ over time for each of the six sodium hydroxide concentrations.

The absorption of $CO_2$ at a sodium hydroxide concentration of 0.625 M and 1.25 M is unsatisfactory. A sharp increase of the absorption of $CO_2$ is observed upon increasing the concentration of the hydroxide. The $CO_2$ absorption at a sodium hydroxide concentration of 6.25 M (corresponding to a $H_2O_2$:OH molar ratio of 1.5:1) reaches 100%.

Example 5

The Effect of Hydrogen Peroxide Concentration on $CO_2$ Absorption

The absorption of $CO_2$ by an aqueous solution of sodium hydroxide and hydrogen peroxide was measured using the experimental set-up described above. A set of experiments was carried out using as absorption medium consisting of water (30 mL), sodium hydroxide (10 grams; 0.25 mol) and various quantities of hydrogen peroxide. The tested hydrogen peroxide concentrations were 9.25 M, 6.25 M and 5 M. Each experiment was allowed to continue for five minutes, during which the $CO_2$ absorption was measured periodically.

Figure 10:
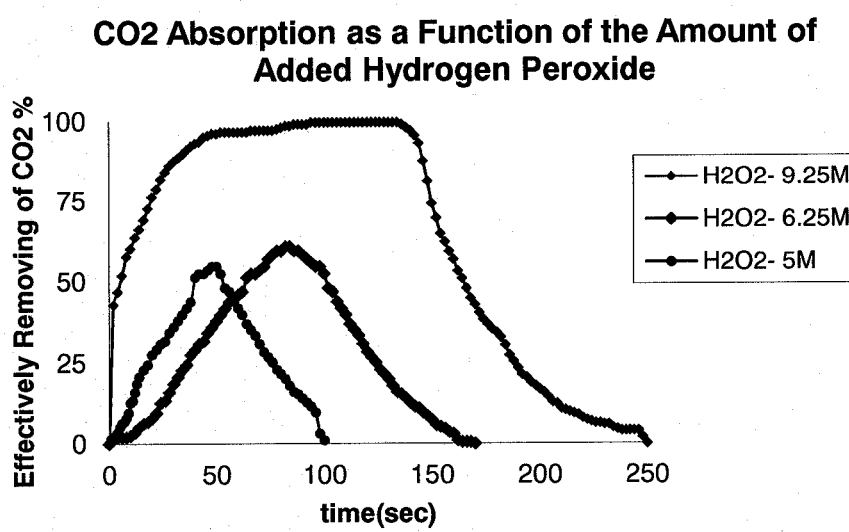
FIG. 10 is a graph showing the absorption of $CO_2$ at various peroxide:hydroxide molar ratios.

The results are depicted in FIG. 10. The $CO_2$ absorption value at a hydrogen peroxide concentration of 9.25 M, corresponding to a $H_2O_2$:OH molar ratio of 1.5:1, reaches 100%. A lower hydrogen peroxide concentration results in reduced $CO_2$ absorbing capacity.

Example 6

Regeneration of Sodium Hydroxide

The absorption of $CO_2$ by an aqueous solution of sodium hydroxide and hydrogen peroxide was measured using the experimental set-up described above. The gas trap was loaded with 1.6 mol water (30 mL), 0.25 mol sodium hydroxide (10 grams) and 0.37 mol hydrogen peroxide (11.3 mL 30% $H_2O_2$ aqueous solution). The experiment was allowed to continue for five minutes, during which the $CO_2$ absorption was measured periodically.

Four consecutive cycles of $CO_2$ absorption were carried out, wherein following each cycle, calcium hydroxide (0.25 mol, 10 grams) was added to the gas trap and the reaction mixture was stirred for 3 minutes in order to regenerate sodium hydroxide, following which an additional 0.37 mol of hydrogen peroxide (11.3 mL 30% $H_2O_2$ aqueous solution) was added to the gas trap.

Figure 11:
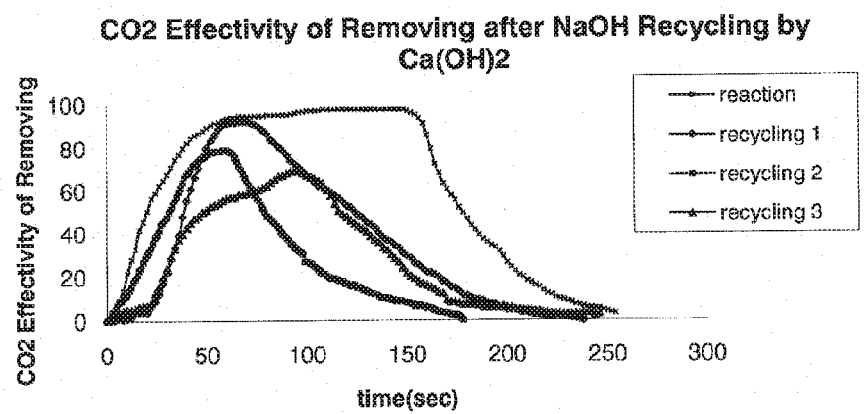
FIG. 11 illustrates a method for recycling the hydroxide used in the process of $CO_2$ absorption.
Figure 12:
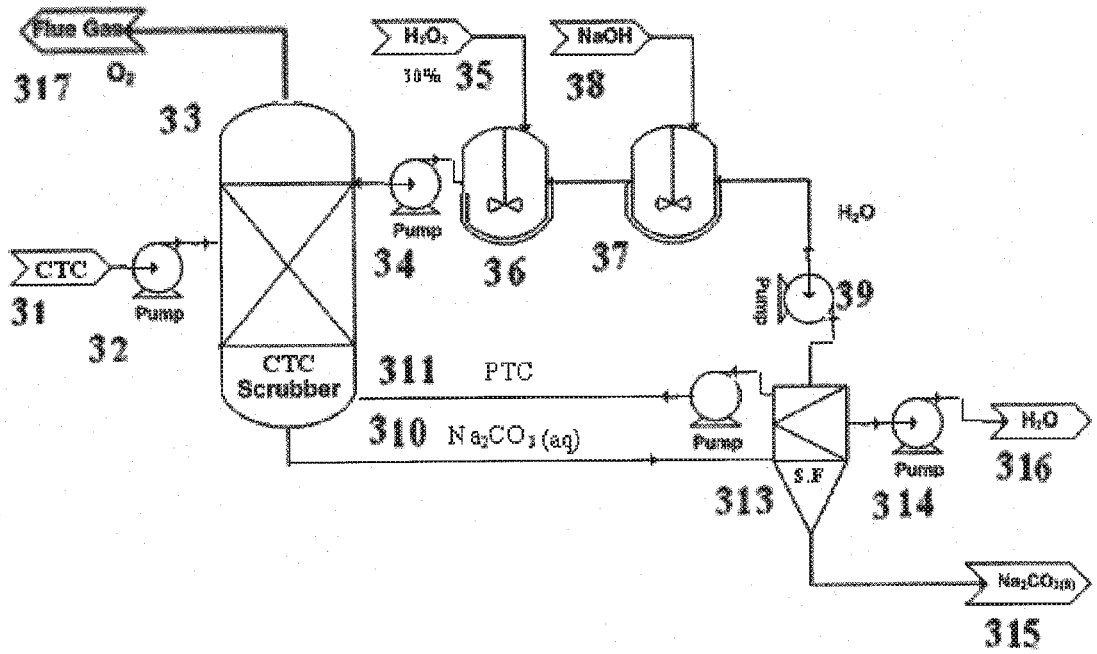
FIG. 12 illustrates an apparatus for carrying out the destruction of $CCl_4$ by the process of the invention.

FIG. 11 depicts the absorption of $CO_2$ (percent relative to the initial $CO_2$ concentration) as a function of time (seconds) for each of the four absorption cycles, demonstrating that the sodium hydroxide regeneration is fairly effective.

Example 7

Carbon Tetrachloride Mineralization by an Aqueous Solution of Hydrogen Peroxide and Sodium Hydroxide in the Presence of Phase Transfer Catalyst The experiments described below were conducted in an adiabatic glass reactor (100 ml) equipped with a reflux condenser and magnetic stirrer at ambient conditions.

A mixture of 4 ml CCl$_4$ (50 mmol), 8 gr sodium hydroxide (200 mmol), 1.1 gr Aliquat 336 (2.5 mmmol), 9.3 ml 30% hydrogen peroxide (300 mmol) and 30 ml distilled water were fed into the reactor in one batch. Stirring was continued for 10 minutes at room temperature. The progress of the reaction was monitored by volumetric analysis of the released carbon dioxide, and measuring the reaction temperature. The released carbon dioxide was captured in an aqueous barium hydroxide scrubber, in order to allow the precipitation of barium carbonate. The precipitated barium carbonate was filtered, dried and weighed to confirm the overall mass balance. After the reaction was completed, the aqueous and organic phases were separated and washed by 10 ml of dichloromethane. The organic phases were combined. The organic solution was tested for the presence of CCl$_4$ by means of GC with FID detector; no traces of CCl$_4$ were detected. The aqueous phase was dried at evaporator and the final reaction solid products were determined by means of X-ray diffraction (XRD) analysis, which indicated that the reaction products of CCl$_4$ mineralization consist of sodium chloride and sodium carbonate.

For the purpose of comparison, CCl$_4$ mineralization was investigated using three comparative reagents:
(i) sodium hydroxide alone [an alkaline solution consisting of 0.25 mol (10 grams) sodium hydroxide dissolved in 30 ml of water]; the conditions of the experiment were as set out above.
(ii) hydrogen peroxide alone [9.3 ml of 30% hydrogen peroxide (300 mmol) in 30 ml distilled water]; the conditions of the experiment were as set out above.
(iii) solid potassium superoxide (KO$_2$). The experiment was conducted in an adiabatic glass reactor (100 ml) equipped with a reflux condenser and a magnetic stirrer at ambient conditions. A mixture of 4 ml CCl$_4$ (50 mmol) and 10 gr potassium superoxide (150 mmol) was fed into the reactor in one batch. Stirring was continued for 1 hour. The liquid and organic phases were then separated and washed by 10 ml of dichloromethane. The organic solution was tested for the presence of CCl$_4$ by means of GC with FID detector.

Figure 13:
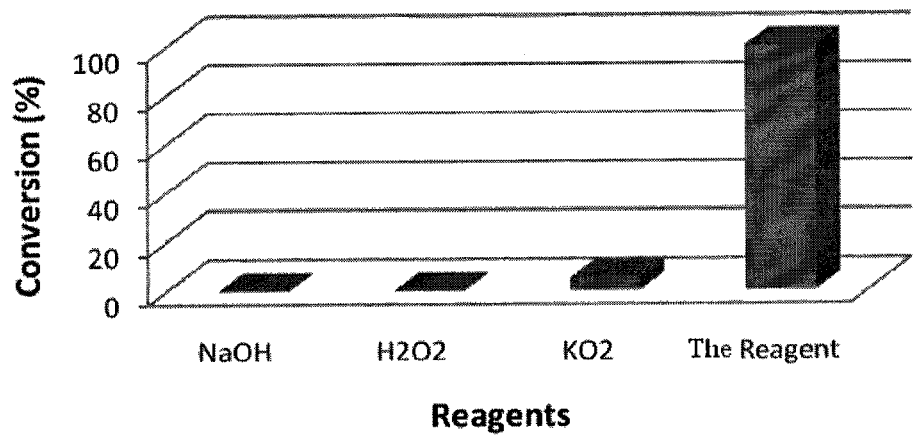
FIG. 13 shows the degree of $CCl_4$ destruction as function of mineralization agent.

The results of the experiment according to the invention and the three comparative experiments are presented graphically in FIG. 13 which shows the CCl$_4$ destruction as function of the mineralization agent. As shown, the mineralization of CCl$_4$ by means of an aqueous solution of sodium hydroxide and hydrogen peroxide ("The Reagent") reached approximately 100% following a reaction which lasted only ten minutes, in comparison to only negligible efficacy demonstrated by the NaOH, H$_2$O$_2$ and KO$_2$ reagents.

Example 8

Methyl Iodide Mineralization by an Aqueous Solution of Hydrogen Peroxide and Sodium Hydroxide in the Presence of Phase Transfer Catalyst The experiments were conducted in an adiabatic glass reactor (100 ml) equipped with a reflux condenser and magnetic stirrer at ambient conditions.

A mixture of methyl iodide (4 ml, 50 mmol), sodium hydroxide (8 gr, 200 mmol), Aliquat 336 (1.1 gr, 2.5 mmol), 30% hydrogen peroxide (9.3 ml, 300 mmol) and 30 ml distilled water were fed into reactor in one batch. Stirring was continued for 10 minutes at room temperature. The progress of the reaction was monitored by volumetric analysis of the released carbon dioxide, and measuring the reaction temperature. The released carbon dioxide was captured in an aqueous barium hydroxide scrubber, in order to allow the precipitation of barium carbonate. The precipitated barium carbonate was filtered, dried and weighed to confirm the overall mass balance. After the reaction was completed the aqueous and organic phases were separated and washed by 10 ml of dichloromethane. The organic phases were combined. The organic solution was tested for the presence of CH$_3$I by means of GC with FID detector; no traces of CH$_3$I were detected. The aqueous phase was dried at evaporator and the final reaction solid products were determined by means of X-ray diffraction (XRD) analysis, which indicated that the reaction products of CH$_3$I mineralization consist of sodium iodide and sodium carbonate.

For the purpose of comparison, CH$_3$I mineralization was investigated using two comparative reagents:
(i) sodium hydroxide alone [an alkaline solution consisting of 0.25 mol (10 grams) sodium hydroxide dissolved in 30 ml of water]; the conditions of the experiment were as set out above.
(ii) hydrogen peroxide alone [9.3 ml of 30% hydrogen peroxide (300 mmol) in 30 ml distilled water]; the conditions of the experiment were as set out above.

Figure 14:
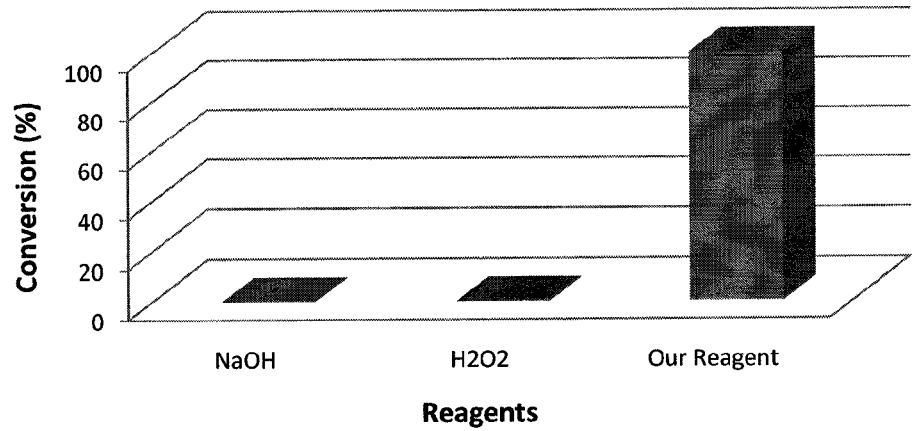
FIG. 14 shows the degree of $CH_3I$ destruction as function of mineralization agent.

The results of the experiment according to the invention and the two comparative experiments are presented graphically in FIG. 14 which shows the CH$_3$I destruction as function of the mineralization agent. As shown, the mineralization of methyl iodide by means of an aqueous solution of sodium hydroxide and hydrogen peroxide ("Our Reagent") reached approximately 100% following a reaction which lasted ten minutes, in comparison to only negligible efficacy demonstrated by the NaOH and H$_2$O$_2$ reagents.

Example 9

Carbon Tetrachloride Mineralization by an Aqueous Solution of Hydrogen Peroxide and Sodium Hydroxide in the Presence of Various Phase Transfer Catalysts In the following set of experiment, the effect of the phase transfer catalyst was investigated. The phase transfer catalysts tested were Aliquat 336, CTAB, DDAB, and TOAB. The experiments were conducted in an adiabatic glass reactor (100 ml) equipped with a reflux condenser and magnetic stirrer at ambient conditions.

A mixture of CCl$_4$ (4 ml, 50 mmol), sodium hydroxide (8 gr, 200 mmol), PTC (1.1 gr, 2.5 mmol), 30% hydrogen peroxide (9.3 ml, 300 mmol) and 30 ml distilled water were fed into reactor in one batch. Stirring was continued for 10 minutes at room temperature. The reaction mixture was treated as set out in previous examples.

Figure 15:
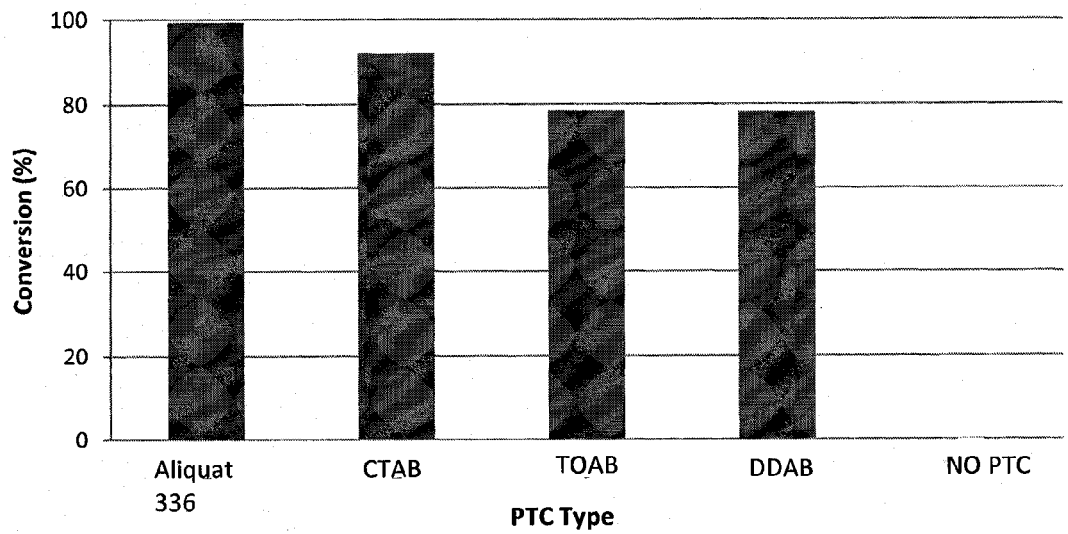
FIG. 15 is a bar diagram illustrating the effect of the presence of a phase transfer catalyst in the destruction of halogenated pollutant.

For the purpose of comparison, CCl$_4$ mineralization was measured under the same conditions but without any PTC. The results are graphically depicted in FIG. 15. As shown, the mineralization of CCl$_4$ can be accomplished to a satisfactory extent in the presence of different types of PTC's, with Aliqout 336 demonstrating the best activity.

Example 10-14

Mineralization of Halogenated Compounds by an Aqueous Solution of Hydrogen Peroxide and Sodium Hydroxide In the following set of experiments, various halogenated pollutants were treated by means of the method of the invention according to the procedure described in Example 8. The details of the experiments and the results are tabulated in Table 1.

TABLE 1

| Ex. | Halogenated compounds | Reaction Products | Reaction Conversion (%) | Reaction Time (min) | Reaction conditions: ratio of NaOH:H$_2$O$_2$ |
|---|---|---|---|---|---|
| 10 | CCl$_3$Br | Na$_2$CO$_3$, NaCl, NaBr, O$_2$ | 100 | 5 | 1:1.5 |
| 11 | CHCl$_2$Br | Na$_2$CO$_3$, NaCl, HBr, O$_2$ | 100 | 5 | 1:1.5 |
| 12 | CHI$_3$ | Na$_2$CO$_3$, NaI, HI, O$_2$ | 100 | 5 | 1:1.5 |
| 13 | CHBr$_3$ | Na$_2$CO$_3$, NaBr, HBr, O$_2$ | 100 | 5 | 1:1.5 |
| 14 | CH$_3$Cl | Na$_2$CO$_3$, NaCl, O$_2$ | 100 | 5 | 1:1.5 |

Example 15-23

Mineralization of Halogenated Organic Compounds in Soil by an Aqueous Solution of Hydrogen Peroxide and Sodium Hydroxide The experiments described below were conducted in an adiabatic glass reactor (500 ml) which contained 60 gr of soil. The tested halogenated organic compound (0.05-0.3 mol) was sponged in the soil. Two different syringes (50 ml) were prepared, one containing 16.6M sodium hydroxide solution and the other 22 ml of 30% hydrogen peroxide solution (710 mmol H$_2$O$_2$). The solutions were injected simultaneously into the soil and the treatment was allowed to continue over a period of tem minutes. After the reaction was completed, the treated soil was washed with 100 ml of dichloromethane on a Buchner funnel. The solid and liquid fractions were separated. The liquid (aqueous and organic) phases were separated in a separation funnel and the organic phases were combined. The organic solution was tested for the presence halogenated organic compounds by means of GC with FID detector. The conditions of the experiments and the results are tabulated in Table 2.

TABLE 2

| Ex. | Halogenated compounds | Reaction Products | Reaction Conversion (%) | Reaction Time (min) | Reaction conditions: ratio of NaOH:H$_2$O$_2$ |
|---|---|---|---|---|---|
| 15 | CCl$_4$ | Na$_2$CO$_3$, NaCl, Cl$_2$, O$_2$ | 100 | 10 | 1:1.5 |
| 16 | CCl$_3$Br | Na$_2$CO$_3$, NaCl, NaBr, O$_2$ | 100 | 10 | 1:1.5 |
| 17 | CHCl$_2$Br | Na$_2$CO$_3$, NaCl, NaBr, O$_2$ | 100 | 10 | 1:1.5 |
| 18 | C$_2$H$_3$Cl$_3$ | Na$_2$CO$_3$, NaCl, O$_2$ | 100 | 10 | 1:1.5 |
| 19 | C$_2$H$_3$Cl$_2$Br | Na$_2$CO$_3$, NaCl, NaBr, O$_2$ | 100 | 10 | 1:1.5 |
| 20 | C$_2$H$_3$ClBr$_2$ | Na$_2$CO$_3$, NaCl, NaBr, O$_2$ | 100 | 10 | 1:1.5 |
| 21 | C$_2$H$_2$Cl$_2$ | Na$_2$CO$_3$, NaCl, O$_2$ | 100 | 10 | 1:1.5 |
| 22 | C$_2$HCl$_3$ | Na$_2$CO$_3$, NaCl, O$_2$ | 100 | 10 | 1:1.5 |
| 23 | C$_2$Cl$_4$ | Na$_2$CO$_3$, NaCl, O$_2$ | 100 | 10 | 1:1.5 |

Example 24

Chlorobenzene Destruction by an Aqueous Solution of Hydrogen Peroxide and Sodium Hydroxide in the Presence of Phase Transfer Catalyst Into a glass vessel (50 ml) equipped with a reflux condenser and magnetic stirrer were added chlorobenzene (7.35 g ml, 50 mmol), Aliquat 336 (0.4 gr, 1 mmol), 30% hydrogen peroxide (6.9 ml, 225 mmol), sodium hydroxide (6 gr, 150 mmol) and 34 ml distilled water. Stirring was continued for 10 minutes at room temperature.

The graph shown in FIG. 16 demonstrates the progress of the reaction, where the abscissa indicates the time of the reaction and the ordinate the degree of chlorobenzene conversion. The Conversion is given by $(1-C_A/C_{A0})$, in which $C_A$ is the reactant (chlorobenzene) concentration and $C_{A0}$: initial reactant (chlorobenzene) concentration. As shown by the graph, following ten minutes reaction at ambient conditions, chlorobenzene was converted completely (apparently into a more oxidized state).

The invention claimed is:

1. A process for treating a medium by the removal or destruction of one or more undesired substances present in said medium, comprising combining hydrogen peroxide and alkali hydroxide in an aqueous solution in a molar ratio from 1.2:1 to 2:1 (H$_2$O$_2$:OH$^-$) to form superoxide, wherein the hydroxide is added to the aqueous solution at a concentration of not less than 1.5 M, and bringing the resultant superoxide-containing solution into contact with said medium.

2. A process according to claim 1, wherein the medium to be treated is halogenated organic pollutant-contaminated soil.

3. A process according to claim 2, wherein the halogenated pollutant contaminating the soil is chlorinated methane.

4. A process according to claim 3, which is a site remediation process, comprising injecting into halogenated organic pollutant-contaminated soil a first stream of hydrogen peroxide solution and a second stream of aqueous alkali hydroxide, or a combined stream of both, such that the molar ratio between the hydrogen peroxide and the hydroxide ion is in the range of 1.2:1 to 2:1.

5. A process according to claim 4, wherein the ratio between the hydrogen peroxide and hydroxide is from 1.4:1 to 1.6:1 (H$_2$O$_2$:OH$^-$).

6. A process according to claim 1, wherein the hydrogen peroxide and the hydroxide source are combined at a molar ratio of from 1.2:1 to 1.6:1 (H$_2$O$_2$:OH$^-$).

7. A process according to claim 6, wherein the hydrogen peroxide and the hydroxide source are combined at a molar ratio from 1.4:1 to 1.6:1(H$_2$O$_2$:OH$^-$).

8. A process according to claim 6, wherein the hydroxide is added to the aqueous solution at a concentration in the range of 2.25 to 20 M.

9. A process according to claim 8, wherein the hydroxide is added to the aqueous solution at a concentration in the range of 3.0 to 9.0 M.

10. A process according to claim 1, wherein the medium to be treated is a gaseous mixture from which carbon dioxide is removed.

11. A process according to claim 10, wherein the carbon dioxide is absorbed by the superoxide-containing aqueous solution in a gas-liquid contactor, whereby said carbon dioxide is converted into an alkali carbonate salt, which is subsequently treated with calcium hydroxide to regenerate the corresponding alkali hydroxide and concurrently form calcium carbonate.

12. The process of claim 11, wherein the calcium carbonate is treated to form calcium hydroxide, which is recycled for regenerating the alkali hydroxide.

13. A process according to claim 1, wherein the medium to be treated consists solely of one or more halogenated organic pollutant(s) to be destroyed, wherein said medium is brought into contact with the superoxide-containing solution in the presence of a phase transfer catalyst.

14. A process according to claim 13, wherein the halogenated organic pollutant is halogenated aliphatic hydrocarbon.

15. A process according to claim 14, wherein the pollutant is selected from the group consisting of halogenated methane, halogenated ethane and halogenated ethylene compounds.

16. A process according to claim 13, wherein the phase transfer catalyst is composed of a nitrogen-containing cation and an anion which is displaceable by a superoxide anion.

17. A process according to claim 16, wherein the phase transfer catalyst is quaternary ammonium salt of the formula $N^+R_1R_2R_3R_4Hal^-$, wherein each of $R_1$, $R_2$, $R_3$ and $R_4$ is independently $C_1$-$C_{18}$ alkyl group and $Hal^-$ indicates halide anion.

18. A process according to claim 17, wherein the quaternary ammonium salt is selected from the group consisting of:

$N^+CH_3[(CH_2)_kCH_3]_3Hal^-$, $N^+(CH_3)_2[(CH_2)_kCH_3]_2Hal^-$, or $N^+[(CH_2)_kCH_3]_4Hal^-$, wherein k is at least 5.

19. A process according to claim 18, wherein the quaternary ammonium salt has the formula $N^+CH_3[(CH_2)_kCH_3]_3Hal^-$, in which k is between 5 and 9.

20. A process according to claim 1, wherein the medium to be treated is halogenated organic pollutant-contaminated liquid, which is brought into contact with the superoxide-containing solution in the presence of a phase transfer catalyst.

* * * * *